June 13, 1961 S. FAVARO 2,988,365

APPARATUS FOR DRIVING GRAMOPHONE RECORDS

Filed July 24, 1958 3 Sheets-Sheet 1

June 13, 1961 S. FAVARO 2,988,365

APPARATUS FOR DRIVING GRAMOPHONE RECORDS

Filed July 24, 1958 3 Sheets-Sheet 3

2,988,365

APPARATUS FOR DRIVING GRAMOPHONE RECORDS

Sergio Favaro, Via Nerino 3, Milan, Italy
Filed July 24, 1958, Ser. No. 750,621
Claims priority, application Great Britain July 29, 1957
24 Claims. (Cl. 274—9)

This invention relates to apparatus for playing gramophone records and is particularly concerned with means for driving and stabilising the records.

It is already known to dispense with the customary turntable and to drive a gramophone record by means of a wheel which frictionally engages one face of the record. The present invention utilises this principle and one of the objects of the invention is to provide an extremely small and readily portable unit for playing gramophone records. Another object is to provide apparatus which, without the use of a speed-changing switch or control member, will drive records of a first size at a first speed and records of a second size at a second speed.

According to one aspect of the present invention, there is provided in an apparatus for playing gramophone records, means for stabilizing the records and for driving records of a first size at a first speed and records of a second size, larger than the first size, at a second speed, comprising a locating member which is to project into the spindle-hole in a record, in order to locate the record, a first driving wheel arranged for frictional engagement with one face of a record of the first size only when such a record is supported as aforesaid, a second driving wheel situated further from the locating member than is said first driving wheel and arranged for frictional engagement with one face of a record of the second size only, when such a record is supported as aforesaid, a motor connected to the driving wheels to drive the same, and stabilizing members which stabilize the record by local contact therewith.

According to another aspect of the invention, there is provided apparatus for playing gramophone recordse comprising a case, a lid on the case, a hinge connection between the lid and the case, a locating member in the case which is to project into the spindle-hole in a record in order to locate the record, a motor in the case, a driving wheel coupled to the motor and arranged to frictionally engage one face of a record, when the latter is located as aforesaid, in order to drive the record, an idly-running stabilizing wheel which is carried by the lid and which engages one face of the record in order to stabilize the record, and further stabilizing members in the case which stabilize the record by local contact therewith.

For a better understanding of the invention and to show how the same may be carried into effect, reference will now be made to the accompanying drawings in which.

Figure 2:
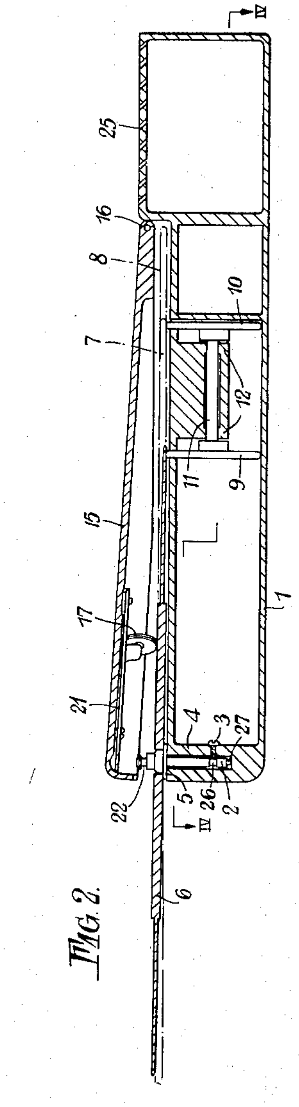
FIGURE 2 is a sectional elevation of the apparatus shown in FIGURE 1 the section being taken along the line II—II of FIGURE 1.
Figure 3:
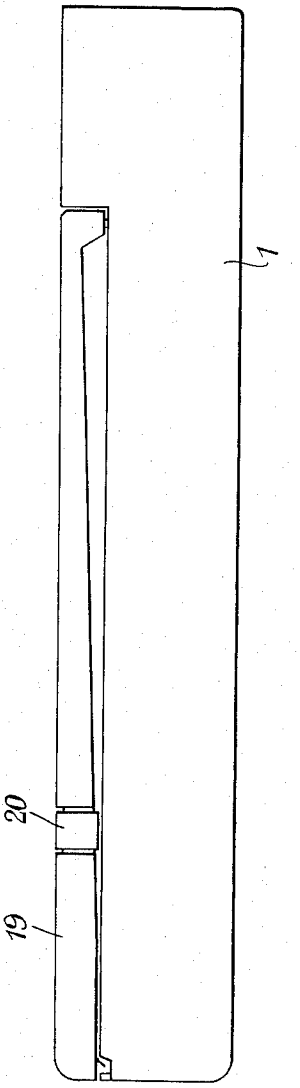
FIGURE 3 is an outside view, in elevation, of the apparatus, and, FIGURE 4 is a sectional plan view of the apparatus, the section being taken along the line IV—IV of FIGURE 2.

Referring to the drawings, the apparatus illustrated is housed in a generally rectangular oblong case 1. The records are to be turned about the axis of a spindle 2 which is located very near one of the shorter sides of the case. In the illustrated example, the axis of the spindle is vertical and the spindle is free to rotate in a bearing formed in an inwardly-projecting rib 4 of the case. A screw 3 passing through the bearing wall has its inner end situated in an annular groove 26 in the spindle 2. The screw 3 does not normally touch the spindle but it serves to prevent the spindle from falling out of the bearing when the case is inverted. The spindle rests at its lower end on a ball 27. The spindle 2 is formed with a flange 5 upon which the lower surface of a record will lie, as shown in FIGURE 2. It will be apparent from this figure that although the flange 5 affords local, central support for the record, it is not large enough to maintain the record horizontal during playing.

Commercially-available "long-playing" records, which must be driven at 33⅓ r.p.m., are of 10 or 12 inches diameter. The "extended-play" records, on the other hand, are to be driven at 45 r.p.m. and are of 7 inches diameter. The illustrated apparatus is designed for driving all these three types of record. A 7-inch, 45-r.p.m. record is shown in full lines in FIGURE 2 and is accorded the reference 6, while 10-inch and 12-inch 33⅓ r.p.m. records, designated by 7 and 8 respectively, are represented by dotted lines. Just beyond the flange 5, the spindle is of the appropriate diameter to suit the standardized spindle hole in the records.

Arranged in the case 1 are two driving wheels 9 and 10 which are mounted on a common shaft 11 so that the wheels and the shaft all rotate together. The shaft runs in bearings 12 provided in the case itself, and is so mounted that its axis, when prolonged, intersects the spindle axis. The driving wheels 9 and 10 have rims of rubber or other plastic material. In the illustrated example, the wheel 9 is shown as being peripherally driven by a roller 28 on the shaft of a motor 13, but other arrangements, for example having a friction, belt or gear drive onto a third wheel on the shaft 11, can be adopted to transmit motion from the motor to the shaft. A 6-volt motor will suffice and this can be powered by four 1.5-volt dry cells 14 in the case 1.

The wheel 9 will engage the under-side of a 7-inch record, 6, near the periphery thereof, while the wheel 10 will engage the under-side of a 10-inch or 12-inch record, 7 or 8, either a little more than 1 inch inward of the periphery or very close to the periphery as the case may be. Such engagement will produce frictional drive of the record. Assuming that there is no slip between the driving wheel and the record surface, the product of the rotational speed and the distance from the rotational axis to the point of contact must be the same, both for the record and for the driving wheel. Thus the distance, $d'$, between the point of contact of the wheel 9 with a 7-inch r.p.m. record and the axis of the spindle 2 is given by:

$$d'=\frac{r'v}{45}$$

and the corresponding distance, $d''$, for a 10-inch or 12-inch, 33⅓ r.p.m. record is $$d''=\frac{r''v}{33\frac{1}{3}}$$

where $r'$ and $r''$ are the radii of the wheels 9 and 10 respectively, and $v$ is the speed of the shaft 11 in r.p.m. The above formulae can be used to select suitable sizes and positions for the wheels 9 and 10, it being remembered that the values of $d'$ and $d''$ must be less than 3½ inches and 5 inches respectively.

The grooved portion of an "extended-play" record generally is thinner than the central portion of the record, as illustrated in FIGURE 2, and is also thinner than a "long-playing" record. This fact must also be taken into consideration when designing the driving wheel arrangement. The top of the wheel 10 is advantageously made the same height as the top of the flange 5 but, in order that the driving wheel 9 does not engage a 10-inch or 12-inch record, the top of the latter wheel is a little lower, this being achieved either by making the wheels 9, 10 of very slightly differing diameters, so that the diameters are substantially, but not exactly, the same, or by suitably inclining the shaft 11. With this arrangement, a 10-inch or 12-inch record will be maintained substantially horizontal, by means of the flange 5, the wheel 10 and two stabilizing wheels, to be described, whereas a 7-inch record will be held, by the flange and stabilizing wheels and the driving wheel 9, in a slightly canted position so that its right-hand side (FIGURE 2) will be low enough to touch the wheel 9. Naturally, the driving wheel sizes and positions could be so chosen that a 7-inch record will be truly horizontal and a 10-inch or 12-inch record will be inclined downwards from right to left, as viewed in FIGURE 2. Again, the 7-inch and larger records could both be slightly canted, in opposite directions, when in position.

A lid 15 is hinged at 16 to the case 1. Upon the under-side of the lid 15 there is mounted a stabilizing wheel 17 which bears upon the central, non-grooved portion of the upper side of the record, applying thereto a force determined by the weight of the lid 15. A second stabilizing wheel, 18, is mounted in a corner of the case 1 and engages the non-grooved central portion of the under-side of the record. The stabilizing wheel 18 stabilizes the record by supporting it from below so it can also be termed a supporting member. The wheels 17 and 18 turn quite freely about axes which intersect the axis of the spindle 2. When considered in plan view, as in FIGURE 1, the angle between the axes of the wheels 17 and 18 will be about 45°, as will be the angle between the axis of the wheel 17 and the axis of the shaft 11.

Figure 1:
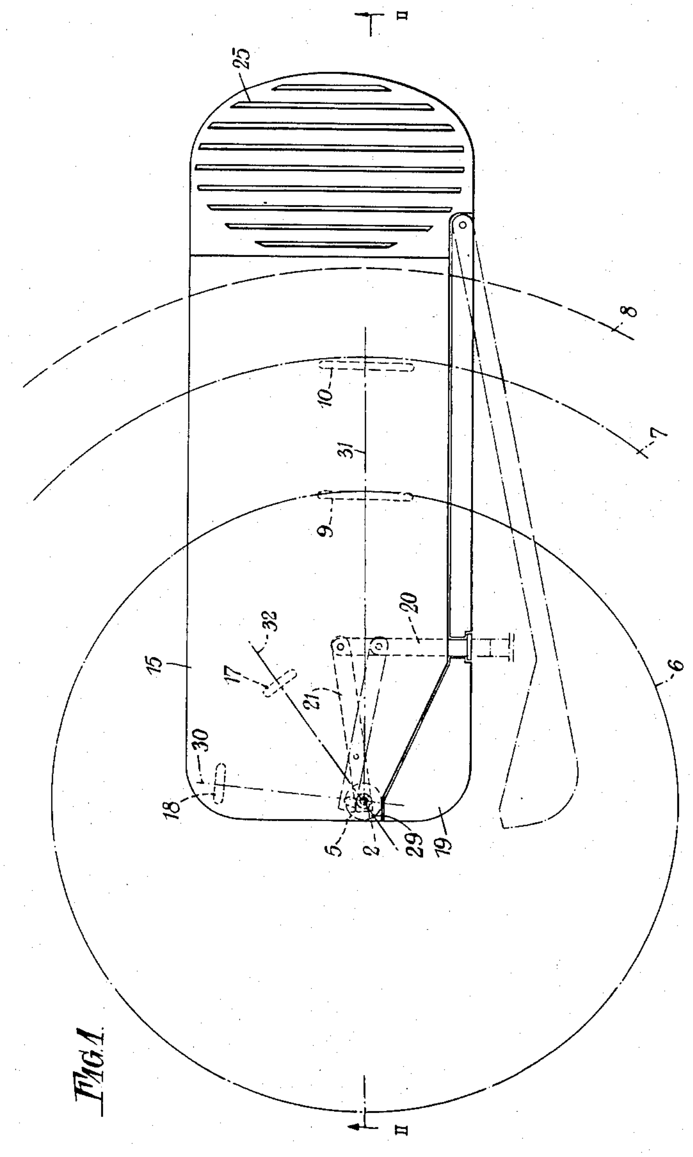
FIGURE 1 is a plan view of a portable record-playing apparatus.

A conventional pick-up arm 19 is connected to the case 1 and can be swung outwardly, as indicated by chain lines in FIGURE 1. When not in use, the pick-up arm can be clamped to the cover 15 by a locking device which also secures the cover 15 to the case 1. The locking device consists of two links 20 and 21 pivotally connected together, the latter being pivotally mounted on the underside of the cover 15. The free end of the link 21 is formed with a slot which can engage around a neck 22 in the spindle 2, thereby securing the cover 15 to the case. The free end of the link 20 is formed as an inverted U, the arms of which lie one on each side of the pick-up arm. When the link 20 is pushed inwardly the locking device occupies the position indicated by dashed lines in FIGURE 1, whereby the cover cannot swing upwardly from the case 1 and the pick-up arm can swing neither upwardly nor outwardly. When the link 20 is pulled out, the locking device occupies the position indicated in dash-dot lines, so that the cover 15 can be lifted, thereby freeing the pick-up arm 19. To permit a change of record, it is merely necessary to lift the cover 15, this being lowered again when the new record is in position. While this is being done, the pick-up arm is conveniently supported upon the top of the outer end of the link 20.

Figure 4:
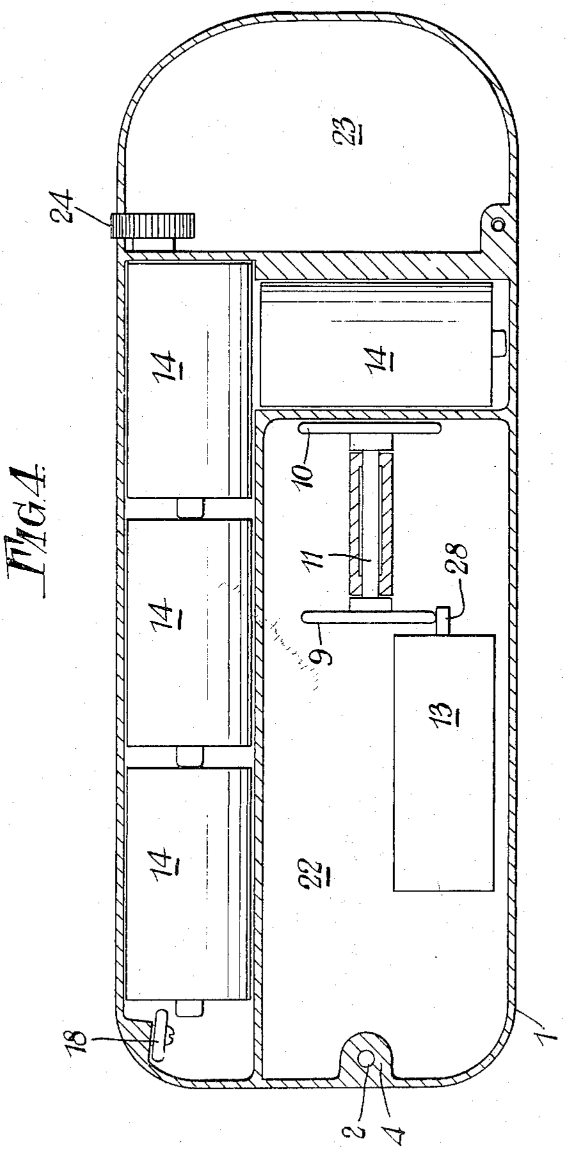

In the spaces marked 22 and 23 in the case 1, there will be provided a transistor amplifier and a speaker respectively. A volume-control knob 24 is indicated in FIGURE 4. The electric circuitry is not illustrated or explained in detail since it is of no interest here. A baffle 25 is provided above the speaker.

It will be seen from FIGURE 1 that the wheels 17, 18 and 9 or 10 all engage the record on one side of a diameter thereof. In fact, they all engage it within a 90° sector of the record.

In the example illustrated, the stabilizing pressure is exerted upon the record by the wheel 17 but it can, in principle, be exerted by any of the wheels which engage the record, provided that such wheel is vertically movable. The driving wheels could both be above the record instead of below it. In one alternative construction, the axis of the driving wheels could bisect an angle formed in a horizontal plane by the axes of the two stabilizing wheels, in which case the driving wheels will be on one side of the record and both stabilizing wheels will be on the other side. The flange 5 of the spindle 2 acts as a central support for the record. This function could, however, be allotted to another member, for example a sleeve, which is not integral with the spindle. It may be desirable to have the central support adjustable as regards its vertical position.

Referring to FIGURE 1, the top of the spindle flange 5, the top of the wheel 18 and the top of the wheel 10 all lie in a plane. In this plane, the line marked 30 joins the top of the wheel 18 to the spindle axis, the line marked 31 joins the top of the wheel 10 to the spindle axis and the line marked 32 is the bisector of the angle made by the lines 30 and 31. In the illustrated example, the spindle axis is perpendicular to the line 32 but it may be convenient to make the spindle axis and the line 32 coplanar but mutually inclined at an angle slightly less than 90°, for example 87°, so that the top of the spindle leans slightly towards the stabilizing wheel 17. With this arrangement, the point marked 29 in FIGURE 1 will be the highest point of the flange 5 and the record will make point contact there with the flange. By thus providing a single point-contact support for the record, on the side of the spindle which is remote from the wheels 9, 10, 17 and 18, it is believed that better stability of the record can be obtained.

It is thought that, instead of using a spindle passing right through the spindle-hole in the record, the record could be supported on a rotund member, for example a ball, which projects into, but not necessarily through, the spindle-hole and locates the record.

The described apparatus could be modified so that the larger records would be driven at 78 revolutions per minute, i.e. the normal speed of 10-inch and 12-inch "standard" records. The outermost driving wheel would then have to turn faster than the inner driving wheel. This could be achieved by suitable gearing.

The factor that determines record speed is the relationship between the peripheral speed of a driving wheel and the distance from the spindle axis at which the wheel contacts the record. If these distances are $R_1$ and $R_2$ inches, respectively, for the driving wheels 9 and 10, and if these wheels are driven at peripheral speeds of $n_1$, and $n_2$ inches per minute, respectively, then the record speeds will be $$\frac{n_1}{2\pi R_1} \text{ and } \frac{n_2}{2\pi R_2}$$

respectively. Thus, the values of $n$ and R will be so chosen as to give record speeds of, say, 33⅓ and 45 r.p.m. or 45 and 78 r.p.m.

The illustrated construction permits of manufacturing to very small dimensions. For example, a prototype has been made with overall case dimensions a little greater than 8 inches by 3 inches by 1½ inches. However, the drive means for the records can be applied to larger, i.e. non-portable, record-playing apparatus. It can also be applied to "record-players," i.e. units which are not equipped with amplifiers and speakers and which must be coupled to separate amplifier and speaker equipment, for example in a radio receiving set. The word "playing," as used herein, is, accordingly, to be construed as not necessarily including the actual production of sound.

The appended claims are not to be construed as covering any apparatus in which one of the supporting members or stabilizing members specified in any claim consists of the needle or stylus which engages the record.

I claim:

1. In an apparatus for playing gramophone records, means for driving and stabilizing records of a first size which must be played at one speed and records of a second size which must be played at a different speed, the records of the second size being of greater diameter than those of the first size, comprising a locating member which is to project into the spindle-hole in a record in order to locate the record, a first record-driving wheel arranged for frictional driving engagement thereof, at a distance $R_1$ inches from the locating member, with one face of a record of the first size located as aforesaid, a second record-driving wheel of substantially the same diameter as the first record-driving wheel arranged for frictional driving engagement thereof, at a distance $R_2$ inches from the locating member, with one face of a record of the second size located as aforesaid, $R_2$ being greater than $R_1$ and greater than the radius of the records of the first size and the second wheel being positioned to hold a record of the second size clear of the first wheel, means for driving the first wheel at a peripheral speed of $n_1$ inches per minute and the second wheel at a peripheral speed of $n_2$ inches per minute $$\frac{n_1}{2\pi R_1} \text{ and } \frac{n_2}{2\pi R_2}$$

being different from one another and being the speeds at which records of the first and second size, respectively, must be played, and stabilizing members which stabilize the record by local contact therewith.

2. Driving and stabilizing means according to claim 1, wherein $R_1$ and $R_2$ are a little less than 3½ inches and 5 inches, respectively, and the means for driving said first and second record-driving wheels comprise means for driving them at peripheral speeds such that $$\frac{n_1}{2\pi R_1} \text{ and } \frac{n_2}{2\pi R_2}$$

are 45 and 33⅓ revolutions per minute respectively.

3. Apparatus for playing gramophone records comprising a case of generally oblong configuration and driving and stabilizing means, according to claim 1, in the case, the locating member being situated adjacent one of the narrow side edges of the case.

4. Driving and stabilizing means according to claim 1, wherein the stabilizing members are constituted by a local, central support for the record, at about the location of the locating member, a first idly-running wheel which makes contact with and is driven by the opposite face of the record to that which engages the driving wheel and a second idly-running wheel which makes contact with and is driven by one face of the record.

5. Driving and stabilizing means according to claim 4, having the first idly running wheel situated above the record position and the central support, the other idly running wheel and the driving wheels being situated below the record position.

6. Apparatus for playing gramophone records comprising a case, driving and stabilizing means according to claim 4 within the case, a lid on the case and a hinge connection between the case and the lid, said first idly running wheel being dependent from said lid.

7. Driving and stabilizing means according to claim 4, wherein the central support is constituted by a flange on the locating member.

8. Apparatus for playing gramophone records comprising a case, a lid on the case of sufficient size to cover at least the greater part of the case, a hinge connection between the lid and the case, a spindle in the case adjacent one side thereof for projecting into the spindle-hole in a record in order to locate the record, a motor in the case, a driving wheel coupled to the motor and arranged to frictionally engage one face of a record, when the latter is located as aforesaid, in order to drive the record, an idly-running wheel which is carried by the lid and which engages one face of the record in order to stabilize the record by gravity effect of the lid thereon, and supporting means in the case to support the record by local contact therewith on the other face thereof.

9. Apparatus according to claim 8, wherein said support means comprise a local, central support for the record, at about the location of the spindle, and an idly-running supporting wheel which makes contact with and is driven by one face of the record.

10. Apparatus according to claim 9, wherein the central support comprises a flange on the spindle.

11. Apparatus according to claim 10, wherein the spindle is inclined to the desired position of the axis of the spindle-hole in the record such that the flange makes point contact with the record on one side of the spindle axis, and wherein the driving, supporting and stabilizing wheels all contact the record on the other side of that axis.

12. An apparatus for playing gramophone records, comprising a case, a locating member situated near one side of the case for projecting into the spindle-hole in a horizontally-disposed record in order to locate the record, a record-driving wheel arranged for frictional driving engagement thereof, at a first location spaced from said member, with the underneath face of a record located as aforesaid, means for driving said wheel, a support for the record constructed and positioned for making only local contact with the central region of said face, a record-supporting member constructed and positioned to make only local contact with said face at a second location and a stabilizing member mounted for displacement into and out of a position in which it makes local contact with the upper face of the record at a third location, said first, second and third locations all being on the same side of a diameter of the record.

13. Record driving and stabilizing means according to claim 12, wherein said first, second and third locations are all within a 90° sector of the record.

14. Driving and stabilizing means according to claim 12 and comprising a case in which the driving and supporting means are supported, a lid for the case and a pivotal connection between the lid and the case, the stabilizing member comprising an idle-running wheel carried by the lid to contact the record with the lid lowered thereover.

15. An apparatus for playing gramophone records, comprising a case, a locating member situated near one side of the case for projecting into the spindle-hole in a horizontally-disposed record in order to locate the record, a record-driving wheel arranged for frictional driving engagement thereof, at a first location spaced from said member, with the underneath face of a record located as aforesaid, means for driving said wheel, a support for the record constructed and positioned for making only local contact with the central region of said face, a record-supporting member constructed and positioned to make only local contact with said face at a second location and a stabilizing member mounted for displacement into and out of a position in which it makes local contact with the upper face of the record at a third location, which is substantially on the bisector of the angle subtended at said locating member by said first and second locations.

16. Apparatus for use in the reproduction of sound comprising a horizontally-disposed flat disc-type gramophone record, portions of the record defining a central spindle-hole therein, a locating member projecting into the spindle-hole in order to locate the record, stabilizing members stabilizing the record by local contact therewith, a first record-driving wheel rotating beneath the record and having its periphery narrowly missing a portion of the underneath face of the record situated at a distance $R_1$ inches from the axis of the spindle hole, said first wheel nevertheless being positioned to engage and drive a smaller record that may be positioned on said locating member in place of the record specified, and a second record-driving wheel of substantially the same diameter as the first record driving wheel rotating beneath the record and having its periphery in frictional driving engagement with the underneath face of the record at a distance $R_2$ inches (greater than $R_1$) from said axis, said first and second driving wheels rotating at peripheral speeds of $n_1$ and $n_2$ inches per minute, respectively, $$\frac{n_1}{2\pi R_1} \text{ and } \frac{n_2}{2\pi R_2}$$

being different from one another, the second being the recommended speed for the record and the first being the recommended speed for a smaller record the radius of which is between $R_1$ and $R_2$.

17. Apparatus for use in the reproduction of sound, comprising a horizontally-disposed flat disc-type gramophone record, portions of the record defining a central spindle-hole therein, a locating member projecting into the spindle-hole in order to locate the record, stabilizing members stabilizing the record by local contact therewith, a first record-driving wheel rotating beneath the record in frictional driving engagement with the underneath face of the record at a distance $R_1$ inches from the axis of the spindle-hole, a second record-driving wheel of substantially the same diameter as the first record-driving wheel situated radially outwardly of the edge of the record and having its top at a distance $R_2$ (greater than $R_1$) from said axis, where it would engage the underneath face of a larger record, having a radius greater than $R_2$, located as aforesaid and would hold that record clear of the first driving wheel, the first and second record-driving wheels rotating at peripheral speeds of $n_1$ and $n_2$, respectively, $$\frac{n_1}{2\pi R_1} \text{ and } \frac{n_2}{2\pi R_2}$$

being different from one another, the first being the recommended speed for the record being driven and the second being that for the larger record aforementioned.

18. Apparatus for use in the reproduction of sound, comprising a horizontally-disposed flat-disc-type gramophone record, portions of the record defining a central spindle-hole therein, a locating member projecting into the spindle-hole in order to locate the record, a case having said member near one side thereof a support for the record making only local contact with the central region of the underneath face of the record, a rotating record-driving wheel in frictional driving engagement with said face at a first location, a first record-stabilizing member making local contact with said face at a second location, a second record-stabilizing member making local contact with the upper face at a third location, and means mounting the second record stabilizing member for displacement so as to permit removal of the record, the first, second and third locations all being on one side of a diameter of the record.

19. Apparatus according to claim 18, wherein the three mentioned locations are all within a 90° sector of the record.

20. Apparatus according to claim 19 and further comprising a case and a hinged lid for the case, the second record-stabilizing member being carried by the lid.

21. In an apparatus for alternately playing phonograph records of different sizes, means for centrally locating a single record, first drive means positioned for frictionally engaging a located record of a first, smaller size in a first plane, second drive means positioned for frictionally engaging a different located record of a second larger size in a second plane at an angle to said first plane with said different record clear of said first drive means, and record supporting and stabilizing means contacting either record selectively in the related plane, said drive means and supporting and stabilizing means being positioned on a same side of a record diameter.

22. In an apparatus for playing gramophone records, means for driving and stabilizing records of a first size which must be played at one speed and records of a second size which must be played at a different speed, the records of the second size being of greater diameter than those of the first size, comprising a locating member which is to project into the spindle-hole in a record in order to locate the record, a first record-driving wheel arranged for frictional driving engagement thereof at a distance $R_1$ inches from the locating member, with one face of a record of the first size located as aforesaid, a second record-driving wheel arranged for frictional driving engagement thereof, at a distance $R_2$ inches from the locating member, with one face of a record of the second size located as aforesaid, $R_2$ being greater than $R_1$ and greater than the radius of the records of the first size and the second wheel being positioned to hold a record of the second size clear of the first wheel, means for driving the first wheel at a peripheral speed of $n_1$ inches per minute and the second wheel at a peripheral speed of $n_2$ inches per minute, $$\frac{n_1}{2\pi R_1} \text{ and } \frac{n_2}{2\pi R_2}$$

being different from one another and being the speeds at which records of the first and second size, respectively, must be played, and stabilizing members which stabilize the record by local contact therewith.

23. Apparatus for use in the reproduction of sound comprising a horizontally-disposed flat disc-type gramophone record, portions of the record defining a central spindle-hole therein, a locating member projecting into the spindle-hole in order to locate the record, stabilizing members stabilizing the record by local contact therewith, a first record-driving wheel rotating beneath the record and having its periphery narrowly missing a portion of the underneath face of the record situated at a distance $R_1$ inches from the axis of the spindle hole, said first wheel nevertheless being positioned to engage and drive a smaller record that may be positioned on said locating member in place of the record specified, and a second record-driving wheel rotating beneath the record and having its periphery in frictional driving engagement with the underneath face of the record at a distance $R_2$ inches greater than $R_1$ from said axis, said first and second driving wheels rotating at peripheral speeds of $n_1$ and $n_2$ inches per minute, respectively, $$\frac{n_1}{2\pi R_1} \text{ and } \frac{n_2}{2\pi R_2}$$

being different from one another, the second being the recommended speed for the record and the first being the recommended speed for a smaller record the radius of which is between $R_1$ and $R_2$.

24. Apparatus for use in the reproduction of sound, comprising a horizontally-disposed flat disc type gramophone record, portions of the record defining a central spindle-hole therein, a locating member projecting into the spindle-hole in order to locate the record, stabilizing members stabilizing the record by local contact therewith, a first record-driving wheel rotating beneath the record in frictional driving engagement with the underneath face of the record at a distance $R_1$ inches from the axis of the spindle-hole, a second record-driving wheel situated radially outwardly of the edge of the record and having its top at a distance $R_2$ greater than $R_1$ from said axis, where it would engage the underneath face of a larger record, having a radius greater than $R_2$, located as aforesaid, and would hold that record clear of the first driving wheel, the first and second record-driving wheels rotating at peripheral speeds of $n_1$ and $n_2$, respectively, $$\frac{n_1}{2\pi R_1} \text{ and } \frac{n_2}{2\pi R_2}$$

being different from one another, the first being the recommended speed for the record being driven and the second being that for the larger record aforementioned.

References Cited in the file of this patent

UNITED STATES PATENTS

| | | |
|---|---|---|
| 687,434 | Myers | Nov. 26, 1901 |
| 2,296,489 | Ash et al. | Sept. 22, 1942 |
| 2,416,583 | Hartley et al. | Feb. 25, 1947 |
| 2,646,283 | Doncaster | July 21, 1953 |
| 2,776,837 | Mueller | Jan. 8, 1957 |

FOREIGN PATENTS

| | | |
|---|---|---|
| 494,987 | Belgium | Aug. 1, 1950 |
| 1,088,379 | France | Mar. 7, 1955 |